United States Patent [19]

Aharon

[11] Patent Number: 4,656,996
[45] Date of Patent: Apr. 14, 1987

[54] SOLAR COLLECTOR

[76] Inventor: Naaman B. Aharon, P.O.B.1016, Beer Sheva 84110, Israel

[21] Appl. No.: 736,780

[22] Filed: May 22, 1985

[30] Foreign Application Priority Data

Jun. 13, 1984 [IL] Israel .................................. 72098

[51] Int. Cl.⁴ ............................................... F24J 2/12
[52] U.S. Cl. ..................................... 126/438; 126/451; 350/613
[58] Field of Search ................ 126/438, 451; 350/613, 350/615, 616

[56] References Cited

U.S. PATENT DOCUMENTS

| | | | |
|---|---|---|---|
| 811,274 | 1/1906 | Carter | 126/438 |
| 2,945,417 | 7/1960 | Caryl et al. | 350/613 X |
| 2,987,961 | 6/1961 | Cotton et al. | 350/613 |
| 3,905,352 | 9/1975 | Jahn | 126/438 X |
| 4,167,178 | 9/1979 | Brussels | 126/438 |
| 4,262,660 | 4/1981 | Ilich | 126/451 |
| 4,345,582 | 8/1982 | Aharon | 126/424 |
| 4,395,581 | 7/1983 | Girard | 136/246 |
| 4,463,749 | 8/1984 | Sobozak et al. | 126/451 |
| 4,465,834 | 8/1984 | Laroche et al. | 350/613 X |

Primary Examiner—Samuel Scott
Assistant Examiner—Allen J. Flanigan
Attorney, Agent, or Firm—Birch, Stewart, Kolasch & Birch

[57] ABSTRACT

A point focusing solar collector comprising at least one pair of segments bearing reflecting surfaces. The surfaces are mounted in such a manner that they form a paraboloidal surface. The segments are arranged in a symmetrical manner on both sides of the vertical axis of the collector. The segments are connected to each other. A stand is provided supporting the segments, e.g. that described in U.S. Pat. No. 4,395,582, which is capable of rotating the segments in the vertical and/or horizontal direction for tracing the position of the sun. An absorber is located at the focus of the collector. Each segment comprises two winglike plates being constituted by two side members which are connected to and arranged in a symmetrical manner on both sides of a central rigid shaft housing a front and a rear end and which plates are distanced from each other and extend parallel to each other, the side members of one winglike plate being at a location closer to the front end than those of the opposite plate. The plates are connected one plate to another. Holes are bored in the side members of each of the plates along an identical parabolic curve at identical locations thereon. A suitable number of reflecting surfaces are provided and provision for the adjustment of the reflecting surfaces is made.

7 Claims, 12 Drawing Figures

SOLAR COLLECTOR

BACKGROUND OF THE INVENTION

The present invention relates to a concentrating solar collector wherein the reflected rays are concentrated on a small area (hereinafter called "point focusing solar collector").

There exist many kinds of solar collectors. They may be divided generally into two types:

1. Those achieving temperatures upto 100° C. which are used in particular to obtain hot water for domestic purposes. For this purpose there exist many collectors, mainly static, flat ones which are quite cheap. However, these known solar collectors are not satisfactory for industry as one cannot achieve temperatures of more than 100° C. which temperature is required for many industrial purposes, e.g. for obtaining steam.

2. Concentrating collectors which achieve temperatures higher than 100° C., which collectors advantageously trace the position of the sun. The concentration may be achieved with the aid of lenses, which, however are rather combersome, complicated and expensive. The concentration may also be achieved by way of reflecting surfaces. The collectors comprising such reflecting surfaces may be constructed in one of the following manners:

a. a linear concentrating solar collector comprising channels having a parabolic cross-section which channels. serve as reflecting surfaces; and a linear absorber being located at the linear focus of the collector. Such a collector is described and claimed in co-pending Israel Patent Application No. 65238.

b. a point focusing collector comprising reflecting surfaces giving a paraboidal surface and an absorber being located at the focus of the paraboloid.

It is readily understood that in a point focusing solar collector a higher concentration of rays can be achieved than in a linear concentrating solar collector. As a result of this higher concentration higher temperatures and a better efficiacy should be achieved.

However, so far no commercially successful point focusing solar collector has been built. There exist severe technical difficulties in the manufacture of the paraboloidal reflecting surface. Said surface should be precise, have a high optical qualtity and be constantly stable. Moreover, it is rather difficult to manufacture such a collector and to assemble it. The maintenance and the operation of such collectors is cumbersome and complicated and the price thereof is too high.

It has therefore been desirable to devise a point focusing collector which overcomes the above drawbacks, i.e. one which gives high working temperatures and a rather high efficiency. Moreover, all parts thereof should be easy to manufacture and to transport and it should also be easy to assemble the collector. Said collector should be relatively cheap and the reflecting surfaces should be of high optical quality, stable and easy to adjust.

SUMMARY OF THE INVENTION

The present invention thus consists in a focusing solar collector comprising:

a. a central construction being the skeleton;
b. at least one pair of segments bearing reflecting surfaces, said segments being built in such a manner that they approximate a paraboloidal surface, said segments being arranged in a symmetrical manner on both sides of the vertical axis of the collector; each segment comprising:

a'. two winglike plates each being constituted by two side members being connected to and arranged in a symmetrical manner on both sides of a central beam having a front and a rear end, said winglike plates being distanced from each other and extending parallel to each other, the side members of one winglike plate being mounted on said central beam at a location closer to said front end than those of the opposite winglike plate;
   b'. means for connecting one winglike plate to another;
   c'. holes bored at the side members of each of said winglike plates along an identical parabolic curve at identical locations thereon;
   d'. a suitable number of reflecting surfaces;
   e'. means for carrying each reflecting surface mounted in said holes; and
   f'. adjustment means on said means for carrying for each reflecting surface;
c. means for connecting the segments to the central construction;
d. means for connecting the segments to each other;
e. a stand for bearing the segments being provided with means for rotating the same in the vertical and/or horizontal direction for tracing the position of the sun; and
f. an absorber located at the focus of the collector and being mounted on the central construction.

The above segment is a novel one and is thus also within the scope of the present invention.

The reflecting surfaces are preferably made of reflecting glass, but may be made from any other suitable reflecting material, e.g. certain plastic materials optionally covered by a reflecting metal; polished aluminium; etc. The surfaces have preferably a square form.

The size of each reflecting surface and the number of such surfaces is a function of the concentration required, of the size of the collector and of the absorber. Between two side members there may be located in one row only one reflecting parabolic surface. However, it is advantageous that there be several flat reflecting surfaces present.

The smaller the reflecting surface the greater the degree of concentration which may be achieved. Therefore, in the present invention a large paraboloidal reflecting surface is composed of many small flat reflecting surfaces. Each such reflecting surface may be adjusted individually to the focus with the aid of for example, a laser beam. This is a cheap and precise manner of construction.

The central rigid beam has a suitable thickness and height giving the required strength to the segment.

The segments arranged in an equal distance from both sides of the vertical axis of the collector are constructed in an identical manner, have the same area and the same paraboloidal surface. One segment being the left one and the other being the right one having the same inclination in opposite directions.

However, the reflective surfaces of the segments being further distanced from said vertical axis are more curved than those of the nearer ones in order to adopt them to the specific parabola causing the paraboloidal surface.

The plates may have any suitable form, e.g. be rectangular, parabolic, have a V-form, etc.

The winglike plates are made of any suitable material, e.g. polyester, but are preferably made of tin. The length of each plate is preferably about 1–3 m and the distance between said two winglike plates is preferably about 50–150 cm.

The means connecting the winglike plates may also serve as means for carrying the reflecting surfaces and are advantageously plates, rods, pipes, angle bars or the like. This means may also have the form of a frame which is also connected to the adjustment means.

The adjustment means enable the raising and lowering of each corner of the reflecting surface thus obtaining a precise parabolic surface in an easy and precise manner. This means are suitably screws or the like.

The entire segment may, if desired, be covered on all sides, except that pointing towards the sun, with a suitable insulating material.

The segments are connected in any suitable manner to each other. An advantageous arrangement is to pass rods, pipes or the like through holes bored in the central rigid means.

The number of pairs of segments is dependent on the size of the collector and of the required concentration.

The stand may be any suitable stand which can carry the segments. A suitable stand is that described and claimed in U.S. Pat. No. 4,345,582. This stand is provided with horizontal and/or vertical means which ascertain that the segments can continuously trace the position of the sun.

The absorber is located in the focus of the collector and may have any suitable hollow form. It should have a diameter as small as possible for the specific construction. In a preferred embodiment of the present invention the absorber is a container at the walls of which is located a coil for the passage of the fluid to be heated. The coil is advantageously a pressure pipe which is attached to the inner wall of the container. The container is covered on the outside with a suitable insulating material.

The container may have any suitable form, e.g. be a vessel, a barrel, etc.

The absorber is, as indicated above, mounted on an independent, rigid and strong construction. Thus, there will be no negative effect on the stand and on the reflecting surfaces which ascertains an optical preciseness. The segments are thus free and not effected by the weight of the absorber so that a precise operation of the collector according to the present invention is achieved.

BRIEF DESCRIPTION OF THE DRAWINGS

The present invention will now be illustrated with reference to the accompanying drawings without being limited by same. (Same parts are marked by identical reference numbers and parts appearing several times are referenced only once.) In the drawings.

DETAILED DESCRIPTION OF PREFERRED EMBODIMENT

Figure 1:
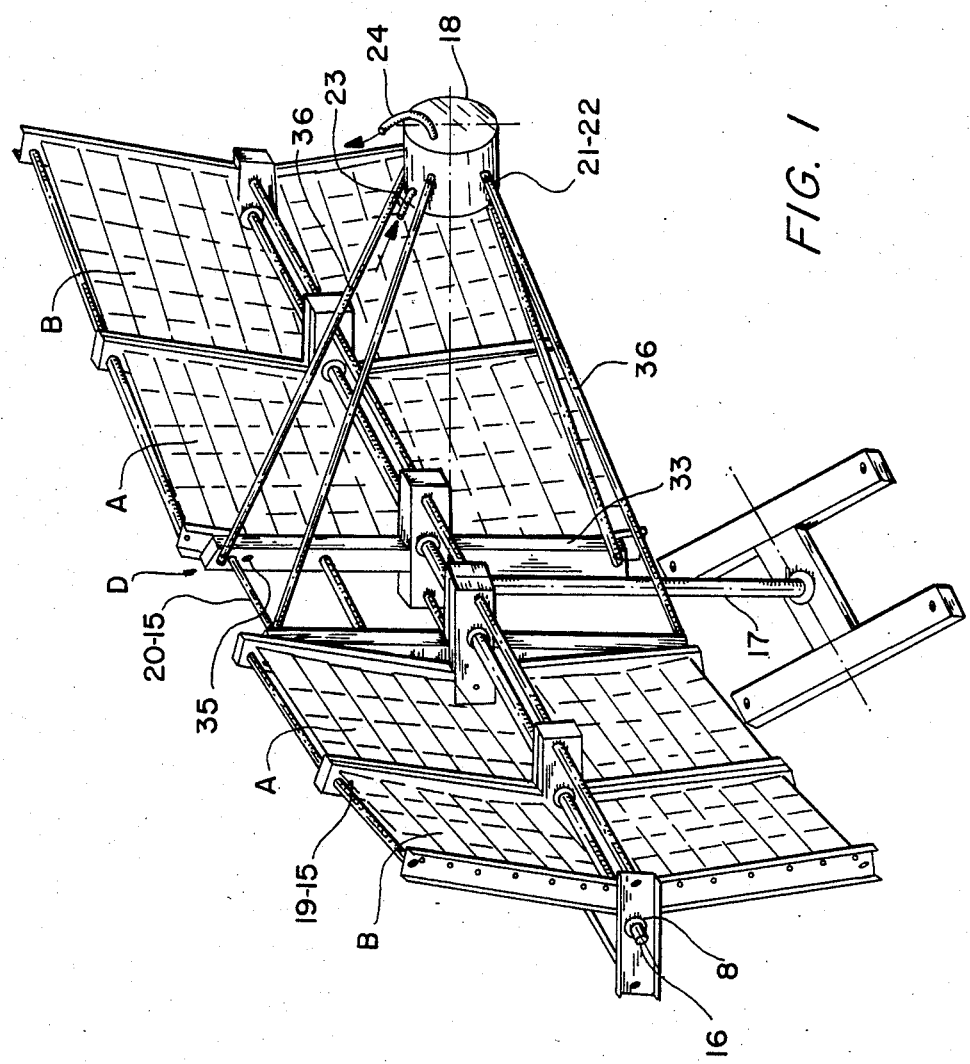
FIG. 1 shows a perspective view of a collector according to the present invention.

FIG. 1 shows a collector according to the present invention comprising one pair of segments A and one pair of segments B. Each pair of segments is built in an identical manner with opposite inclinations, whereas segments A and B differ from each other by their curvature. For the sake of clarity only two pairs of segments are shown. However, as indicated above the number of required pairs of segments has to be chosen for each collector. Segment A is illustrated in detail in FIG. 2.

The segments are mounted on a rigid stand comprising vertical central shaft 17 and horizontal shaft 16. (The stand being utilized is that described in U.S. Pat. No. 4,345,582. Shaft 16 is located at the center of gravity of the collector.

Construction D carrying absorber 18 which is located in the focus of the collector, is erected in connection with shaft 16. Construction D is illustrated in detail in FIG. 7.

Segments A adjoining shaft 17 are connected to construction D by screws passing through holes 9. The screws are constructed in such a manner that they do not cause any stress to beams 3 of the segments.

Figure 2:
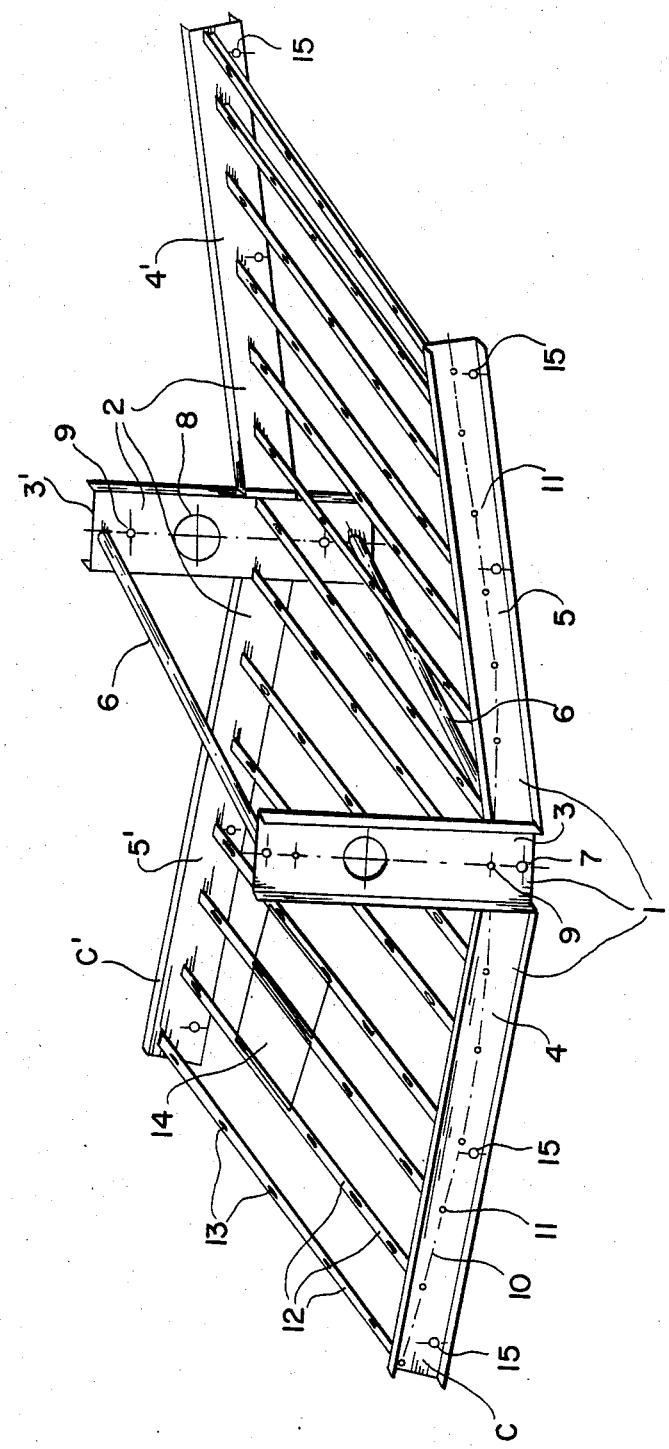
FIG. 2 shows a perspective view of a segment according to the present invention.

Segment A illustrated in FIG. 2 comprises two winglike plates C and C' each consisting of side members 4 and 5 and 4' and 5', respectively being connected to central beams 3 and 3', respectively. Holes 8 are bored at identical heights on beams 3 and 3'. Shaft 16 passes through the holes 8. Side members 4 and 5 are located higher to a certain extent than side members 4' and 5'.

Holes 9 serve for connecting beams 3 of adjoining segments which are mounted on horizontal shaft 16 of the collector and thus form a rigid unit. Beams 3 and 3' are connected to each other by rigid straight rods 6 by way of screws passing through holes 7. The holes 7 are in equal distances from the edges of beams 3 and 3' thus ascertaining that winglike plates C and C' extend exactly parallel to each other.

In each segment side members 4 and 5 of winglike plates C are welded to beams 3 in another height. In those segments which are nearer to shaft 17, side members 4 and 5 are welded at a lower point of the beams than in those segments which are farther away from shaft 17. The precise location of the welding depends on the coordinates of the specific point of the basic parabola of the collector.

When the segment is mounted on shaft 16, winglike plates C extend perpendicularly to this shaft.

On side members 4 and 5 of each winglike plate C the form of a basic parabola 10 is indicated. Along parabola 10 are located holes 11 in equal distances from each other. Holes 11 are exactly in the same position on opposite winglike plates C and C'. However, as side members 4' and 5' of distanced winglike plate C' are higher than those of nearer winglike plate C, holes 11' in plate C' are higher than corresponding holes 11 in plate C. Between opposite corresponding holes 11 extend rods 12. Rods 12 may, for example, have the form of an angle bar, a plane strip or the like. Rods 12 are fixed by screws in holes 11. Rods 12 ascertain a fixed distance between winglike plates C and C' and strengthen the whole construction. On rods 12 are located in equal distances grooves 13. Clamping means (shown in detail in FIG. 5) which hold the units of reflecting surfaces 14 are put into grooves 13. On each side member of winglike plate C are bored holes 15 in precise distances from the axis. The connecting means passing through holes 15 serve to connect adjoining segments to each other.

Figure 3A:
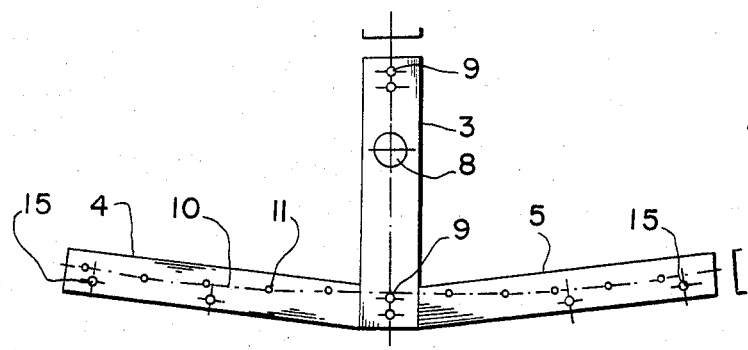
FIGS. 3d, 3b, 3c and 3d show side views of various plates.
Figure 3B:
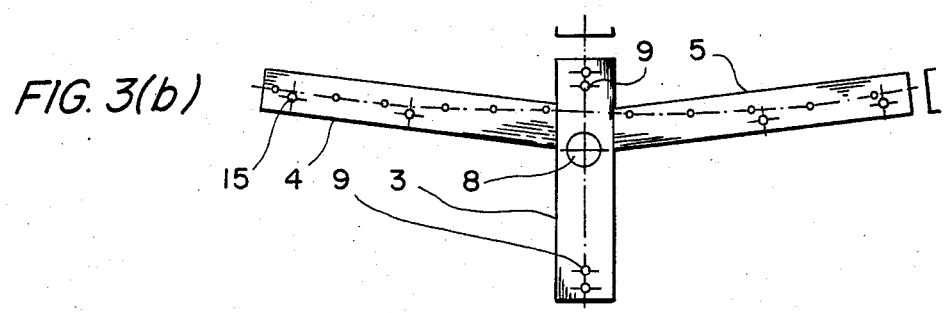

FIGS. 3a–3d show side views of various winglike plates C having different profiles. In all embodiments beam 3 has a U-profile. However, it may also be flat, have a T-profile or the like. FIGS. 3a and 3b show identical profiles. However, in FIG. 3a side members 4 and 5 are welded to beam 3 in a lower position than in FIG. 3b.

Figure 3C:
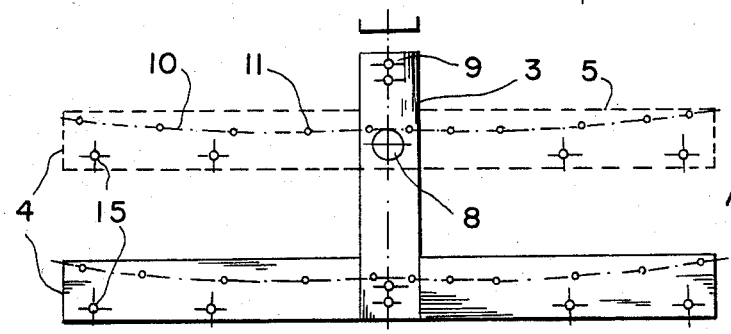

Side members 4 and 5 are flat in the profile shown in FIG. 3c. This profile is very advantageous for a collector having a relatively flat parabola and the focus in which absorber 18 is located is far distanced.

Figure 3D:
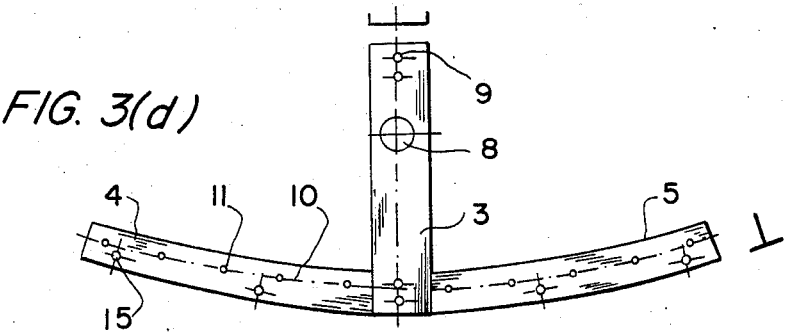

Side members 4 and 5 shown in FIG. 3d have the form of a parabola and the profile has a T form.

Figure 4:
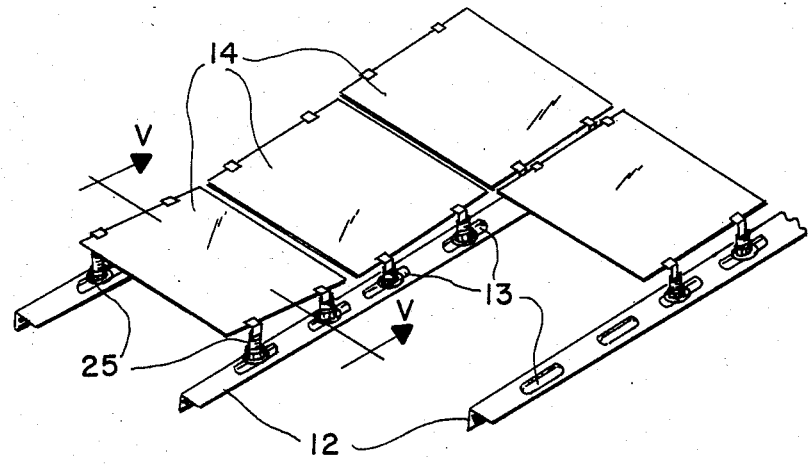
FIG. 4 shows a perspective view of some reflecting surfaces located on carrying means.
Figure 5:
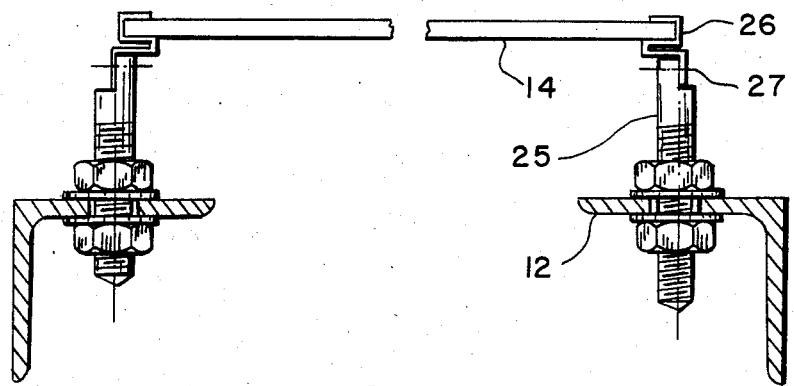
FIG. 5 shows a section along line V—V of FIG. 4.

FIG. 4 illustrates the manner the units of the reflecting surfaces 14 are placed to form the paraboloidal surface of the collector. Grooves 13 on rods 12 are provided with clamping means 25 which hold reflecting surfaces 17 and enable as shown in FIG. 5 quick and precise adjustment thereof. Clamping means 25 is a screw which cooperates with nuts on either side of rod 12. Clamp 26 is connected to screw 25 by pin 27. The clamping means thus enables the adjustment of the exact position of reflecting surface 14.

Figure 6A:
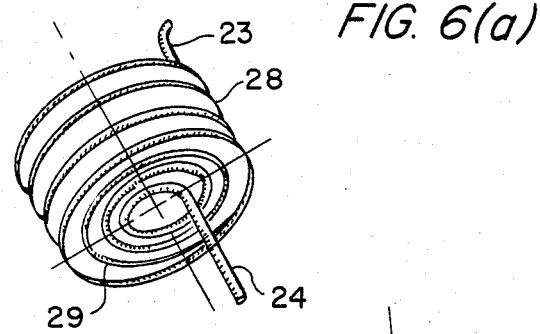
FIG. 6a shows a perspective view of a coil to be located within a container as part of an absorber.
Figure 6B:
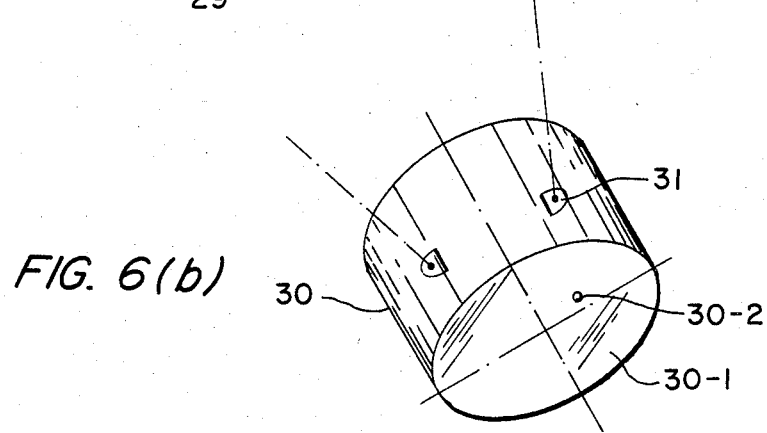
FIG. 6b shows a perspective view of a container being part of the absorber.
Figure 6C:
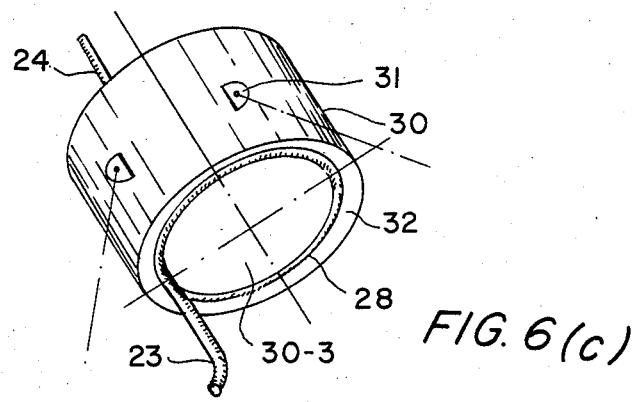
FIG. 6c shows a perspective view of an absorber being assembled from the coil shown in FIG. 6a and the container shown in FIG. 6b.

Absorber 18 shown in FIG. 6c comprises coil 28 (shown in FIG. 6a). The coil 28 is made from a pressure and high temperature resisting pipe. Coil 28 is made of two parts, namely of spiral coil 28 and of Archimedes like spiral 29 connected to each other. Outlet 24 for the heated fluid constitutes the end of spiral 29 and inlet 23 for said fluid constitutes the beginning of coil 28.

FIG. 6b shows container 30 comprising back cover 30-1 having a hole 30-2 through which outlet 24 of coil leaves. Inlet 23 is positioned near opening 30-3 of container 28 pointing towards reflecting surfaces 14 (not shown). Coil 28 extends along the walls of container 30. Absorber 18 is surrounded by insulating layer 32. Cover 30-1 is located at the top of absorber 18 and opening 30-3 at the bottom, the entire absorber 18 being thus a heat trap.

The sun rays reflected from reflecting surfaces 14 enter container 30 through opening 30-3 and hit coil 28, the inner walls or cover 30-1 of container 30.

Absorber 18 is connected to central construction D (shown in detail in FIG. 7) by flanges 31 and rods 36.

Figure 7:
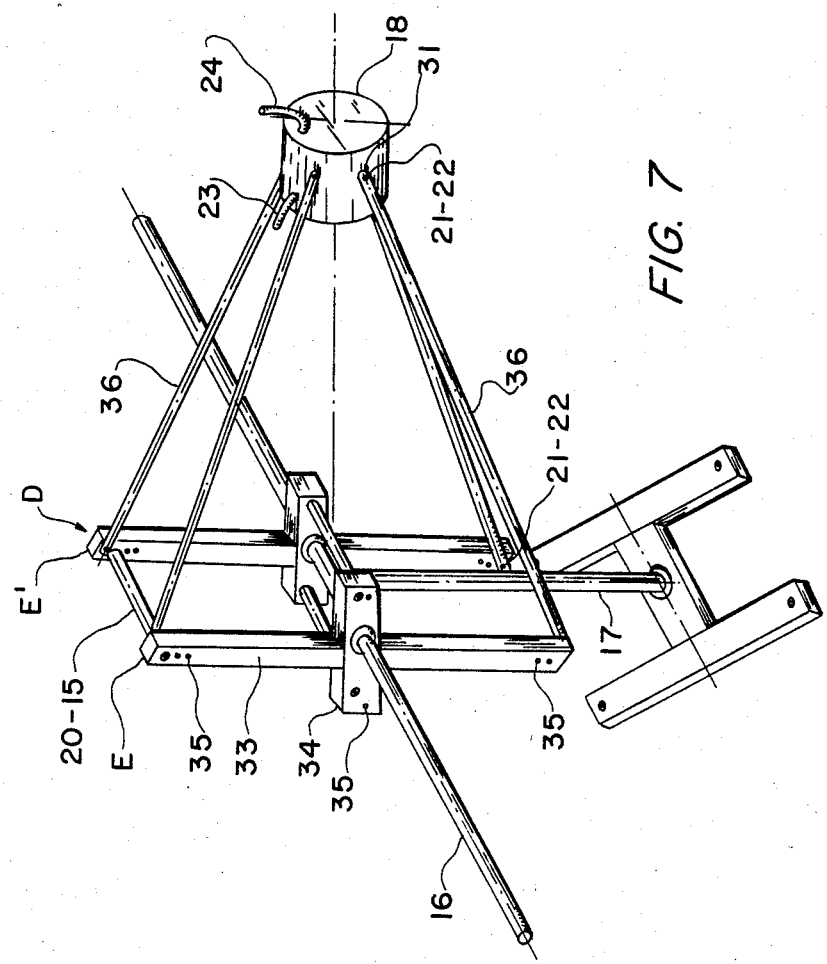
FIG. 7 shows a perspective view of a construction for bearing the absorber

The central rigid cenatruction D shown in FIG. 7 comprises parts E and E'. Each part E consists of rods 33 and 34 arranged in a cross-like manner. Parts E and E' extend parallel to each other and are connected to each other by rods 15 held by screws 20. Thus a rigid construction is achieved. Rigid rods 36 connect absorber 18 to the supporting construction and ascertain that absorber 18 remains in the focus of the paraboloidal surface. The rods also support the pipes forwarding the fluid to absorber 18. Construction D is mounted on horizontal shaft 16. With the aid of holes 35 the segments are connected to the supporting construction D in a rigid and precise manner without being distorted by the weight of absorber 18 or the wind forces. The segments move together with absorber 18 around shaft 16 easily without requiring great forces and using simple means, thus ascertaining that absorber 5 is always within the focus of the paraboloid.

I claim:
1. A focusing solar collector comprising:
   a. a central construction being the skeleton;
   b. at least one pair of segments bearing reflecting surfaces, said segments being built in such a manner that they approximate a paraboloidal surface, said segments being arranged in a symmetrical manner on both sides of the vertical axis of the collector; each segment comprising:
      a'. two winglike plates each being constituted by two side members being connected to and arranged in a symmetrical manner on both sides of a central beam having a front and a rear end, said winglike plates being distanced from each other and extending parallel to each other, the side members of one winglike plate being mounted on said central beam at a location closer to said front end than those of the opposite winglike plate;
      b'. means for connecting one winglike plate to another;
      c'. holes bored in the side members of each said winglike plates along an identical parabolic curve at identical locations thereon;
      d'. a suitable number of reflecting surfaces;
      e'. means for carrying each of said reflecting surfaces mounted in said holes;
      f'. adjustment means on said means for carrying for each of said reflecting surfaces;
   c. means for connecting said segments to said central construction;
   d. means for connecting said segments to each other;
   e. a stand for bearing said segments being provided with means for rotating the same in the vertical and/or horizontal direction for tracing the position of the sun; and
   f. an absorber located at the focus of the collector and being mounted on said central construction.

2. A collector according to claim 1, wherein each of said reflecting surfaces is made of reflecting glass.

3. A collector according to claim 1, wherein each of said reflecting surfaces is square.

4. A collector according to claim 1, wherein said stand comprises a vertical central shaft and a horizontal shaft.

5. A collector according to claim 1, wherein the absorber is a container along the inner walls of which extends a coil for the passage of the fluid to be heated.

6. A collector according to claim 5, wherein said coil is a pressure pipe attached to said inner walls.

7. A segment to be used in a point focusing solar collector comprising:
   a. two winglike plates each being constituted by two side members being connected to and arranged in a symmetrical manner on both sides of a central rigid beam having a front end and a rear end, said winglike plates being distanced from each other and extending parallel to each other, the side members of one winglike plate being mounted on said central beam at a location closer to said front end than those of the opposite winglike plate;
   b. means for connecting one winglike plate to another;
   c. holes bored in the side members of each of said winglike plates along an identical parabolic curve at identical locations thereon;
   d. a suitable number of reflecting surfaces;
   e. means for carrying each of said reflection surfaces mounted in said holes; and
   f. adjustment means on said means for carrying for said reflecting surfaces.

* * * * *